US011488392B2

United States Patent
Chen et al.

(10) Patent No.: US 11,488,392 B2
(45) Date of Patent: Nov. 1, 2022

(54) VEHICLE SYSTEM AND METHOD FOR DETECTING OBJECTS AND OBJECT DISTANCE

(71) Applicant: Harman International Industries, Incorporated, Stamford, CT (US)

(72) Inventors: Liangfu Chen, Shanghai (CN); Zeng Yang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/970,313

(22) PCT Filed: Mar. 15, 2018

(86) PCT No.: PCT/US2018/018449
§ 371 (c)(1),
(2) Date: Aug. 14, 2020

(87) PCT Pub. No.: WO2019/177562
PCT Pub. Date: Sep. 19, 2019

(65) Prior Publication Data
US 2021/0089794 A1   Mar. 25, 2021

(51) Int. Cl.
*G06K 9/00* (2022.01)
*G06K 9/20* (2006.01)
(Continued)

(52) U.S. Cl.
CPC ........... *G06V 20/58* (2022.01); *G06K 9/6256* (2013.01); *G06K 9/6268* (2013.01); *G06V 10/22* (2022.01);
(Continued)

(58) Field of Classification Search
CPC .......... G06K 9/00798; G06K 9/00805; G06K 9/2054; G06K 9/4628; G06K 9/4671; G06K 9/52; G06K 9/6256; G06K 9/6268
See application file for complete search history.

(56) References Cited

U.S. PATENT DOCUMENTS 9,760,806 B1 * 9/2017 Ning ................... G06N 3/0454
2004/0189451 A1   9/2004 Zoratti
(Continued)

OTHER PUBLICATIONS

Stein, G. et al., "Vision-based ACC with a Single Camera: Bounds on Range and Range Rate Accuracy," Proceedings of the IEEE IV2003 Intelligent Vehicles Symposium, Jun. 9, 2003, Columbus, Ohio, 6 pages.

(Continued)

*Primary Examiner* — Michael J Vanchy, Jr.
(74) *Attorney, Agent, or Firm* — McCoy Russell LLP

(57) ABSTRACT

The present disclosure relates to object detection and object distance determination by an assisted driving system of a vehicle. In one embodiment, a method includes receiving image data detected and detecting at least one object in the image data. Detecting includes determining a region of interest in the image, classifying the object and localizing the region of interest in the image data. The method may include determining a distance value for the at least one object, wherein the distance determination is determined based on the category determined, localization of the region of interest, and object size relative to the image data. The method may include outputting a distance value determination for the at least one object.

18 Claims, 5 Drawing Sheets

(51) Int. Cl.
    G06K 9/62      (2022.01)
    G06K 9/46      (2006.01)
    G06K 9/52      (2006.01)
    G06V 20/58     (2022.01)
    G06V 10/22     (2022.01)
    G06V 10/42     (2022.01)
    G06V 10/46     (2022.01)
    G06V 20/56     (2022.01)

(52) U.S. Cl.
    CPC ............ G06V 10/42 (2022.01); G06V 10/462 (2022.01); *G06V 20/588* (2022.01)

(56) References Cited

U.S. PATENT DOCUMENTS

| | | | |
|---|---|---|---|
| 2008/0150786 A1* | 6/2008 | Breed | G05D 1/0274 342/53 |
| 2012/0001771 A1 | 1/2012 | Roth et al. | |
| 2012/0027290 A1 | 2/2012 | Baheti et al. | |
| 2014/0313339 A1* | 10/2014 | Diessner | G06V 20/58 348/148 |
| 2015/0117760 A1 | 4/2015 | Wang et al. | |
| 2016/0098619 A1 | 4/2016 | Gaidon et al. | |
| 2018/0189596 A1* | 7/2018 | Lee | G06V 10/50 |
| 2018/0330175 A1* | 11/2018 | Corcoran | H04N 7/181 |

OTHER PUBLICATIONS

Saxena, A. et al., "Learning Depth from Single Monocular Images," Proceedings of the 19th Annual Conference on Neural Information Processing Systems (NIPS 2005), Dec. 5, 2005, Vancouver, British Columbia, Canada, 8 pages.

Chen, L. et al., "Driving Scene Perception Network: Real-time Joint Detection, Depth Estimation and Semantic Segmentation," Proceedings of the 2018 IEEE Winter Conference on Applications of Computer Vision, Mar. 12, 2018, Lake Tahoe, Nevada, 9 pages.

ISA United States Patent and Trademark Office, International Search Report and Written Opinion Issued in Application No. PCT/US2018/018449, dated Jul. 6, 2018, WIPO, 10 pages.

* cited by examiner

VEHICLE SYSTEM AND METHOD FOR DETECTING OBJECTS AND OBJECT DISTANCE

CROSS-REFERENCE TO RELATED APPLICATIONS

The present application is a U.S. National Phase of International Patent Application Serial No. PCT/US2018/018449 entitled "VEHICLE SYSTEM AND METHOD FOR DETECTING OBJECTS AND OBJECT DISTANCE," filed on Mar. 15, 2018. The entire contents of the above-referenced application is hereby incorporated by reference for all purposes.

FIELD

The present disclosure relates to electronic devices and applications, and more particularly to processes and configurations for detecting objects and object distance by vehicle systems including, assisted driving systems and autonomous driving systems.

BACKGROUND

The demand for high-level autonomous driving has increased recently. Many existing autonomous driving systems utilize imaging, such as a pixel-level mapping to detect objects. Many of the existing configurations are computationally expensive. In many cases these systems lack the ability to provide robust data for vehicle control. There exists a need and a desire for improved imaging configurations and devices. There also exists a desire for vehicle systems that overcome one or more limitations of conventional systems.

BRIEF SUMMARY OF THE EMBODIMENTS

Disclosed and claimed herein are methods, devices and systems for object detection and object distance determination by an assisted driving system of a vehicle. One embodiment is directed to a method including receiving, by a module of an assisted driving unit, image data detected by an image sensor mounted to a vehicle. The method also includes detecting, by the module of the assisted driving unit, at least one object in the image data, wherein detecting the at least one object includes determining a region of interest in the image data for the at least one object, classifying the at least one object, wherein a category is determined for the at least one object, and localizing the region of interest in the image data for the at least one object. The method also includes determining, by the module of the assisted driving unit, a distance value for the at least one object, wherein the distance determination is determined based on the category determined, localization of the region of interest, and object size relative to the image data. The method also includes outputting, by the module of the assisted driving unit, a distance value determination for the at least one object.

In one embodiment, image data received by the module is captured by an optical image sensor configured to output image data.

In one embodiment, detecting at least one object includes detection of one or more of a person, pedestrian, vehicle, roadway, lane marker, hazard and objects relative to the position of the image sensor.

In one embodiment, the region of interest is determined based on at least one trained parameter for object detection and object distance.

In one embodiment, classifying the at least one object includes estimating anchor boxes from concatenated outputs of multi-scale feature encoding layers and decoding layers.

In one embodiment, multiple aspect ratios are applied to each feature layer to predict class labels, bounding boxes a depth label for the at least one object.

In one embodiment, the distance value is determined by scaling object size determined from pixel-level semantic features and preserved instance-level features of input layers.

In one embodiment, the distance value is determined by hierarchical encoding layers that preserve instance-level features and pixel-level features within a shared convolutional architecture.

In one embodiment, outputting includes providing the distance value for at least one of a cruise control controller, emergency braking system and vehicle controller in general.

In one embodiment, the method also includes suppressing overlapping low confidence bounding boxes.

Another embodiment is directed to an assisted driving module including an image sensor to detect image data, and an object detection module coupled to the image sensor. The object detection module includes a processor configured to receive image data detected by the image sensor mounted to the vehicle. The processor is configured to detect at least one object in the image data, wherein detecting the at least one object includes determine a region of interest in the image data for the at least one object, classify the at least one object, wherein a category is determined for the at least one object, and localize the region of interest in the image data for the at least one object. The processor is configured to determine a distance value for the at least one object, wherein the distance determination is determined based on the category determined, localization of the region of interest, and object size relative to the image data. The processor is configured to output a distance value determination for the at least one object.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
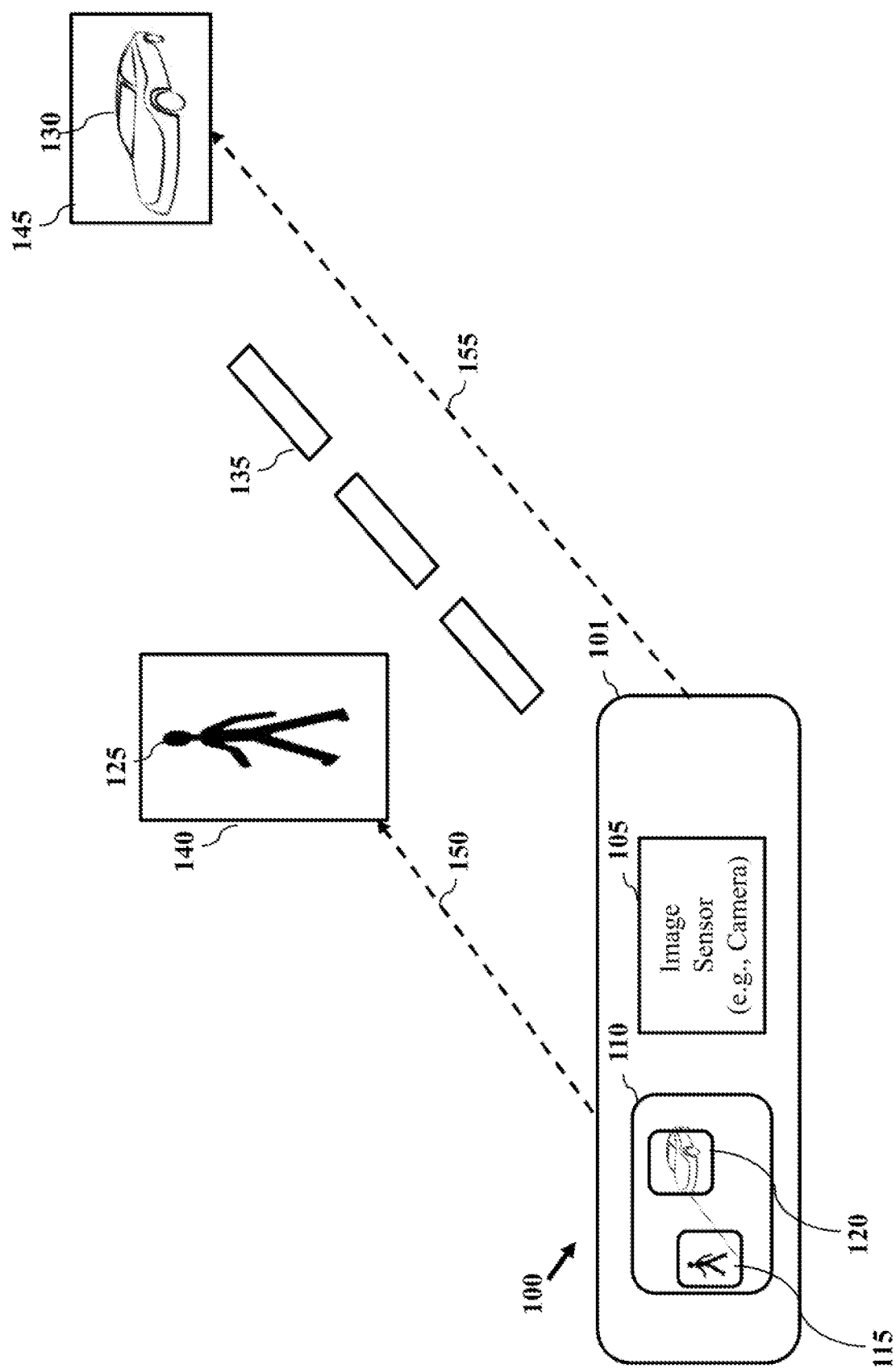
FIG. 1 depicts a graphical representation of object detection by an assisted driving system of a vehicle according to one or more embodiments.

One aspect of the disclosure is directed to a vehicle system to acquire data for a surrounding environment using image analysis. In one embodiment, system configurations and processes are configured to determine instance-level object classes, regions of interest and distance determinations. The systems and processes described herein provide efficient and accurate instance level determinations of object class and object location. In one embodiment, object detection includes determining a distance value associated with each object detected. According to another embodiment, object classes and location are determined simultaneously. According to yet another embodiment, object detection includes determination of a distance value and may be based on trained data. Systems and processes described herein may also provide robust and accurate determinations in complicated road scenes. In one embodiment, a pre-trained neural network is employed on a large scale data set to provide location, including three-dimensional detection that is robust and accurate. Systems and processes described herein may also provide widely applicable assisted driving applications including, but not limited to, vision based adaptive cruise control (ACC), automatic emergency breaking (AEB) and object detection applications for vehicle operation.

In one embodiment, a system is configured to detect objects using an image sensor (e.g., camera) without the necessity of high cost assistive data devices such LIDAR (light detection and ranging). The system includes an imaging device, and object detection module configured to determine and output distance determinations for detected objects. The system may be a part of, or employed by, an assisted driving system such as an autonomous driving system and a vehicle driver assistance system (e.g., advanced driver assistance system (ADAS)). In other embodiments, the system may be associated with an infotainment system, and vehicle system in general. Systems described herein may operate based on network training process for object classification, object localization and distance information. The system may employ a detection framework that allows for distance determination with object detection.

In one embodiment, a process is provided for object detection. The process may include determining distance values for objects based on at least one of object classification, localization of regions of interest, and object characteristics. In one embodiment, objects may be scaled to determine a distance value for the object. In other embodiments, details on location information provided from low-level encoding layers and instance-level object categorical information from higher level encoding layers may be employed to determine distance values of objects. The process may include outputting one or more distance values for detected objects to one or more elements of an assisted driving system. Processes described herein may be applied to optical image devices (e.g., digital cameras, etc.) for detecting image and video content. The processes may provide an ordered series of functions performed by vehicle hardware to enhance object detection and improve operation of a vehicle assist system and devices. Processes described herein may be employed by device and system configurations and can include the use of training and learning algorithms for object detection.

Processes and system configurations discussed herein are configured to provide features which may enable fully autonomous driving. Distance determinations, such as a depth, and distance labels, may be determined using a convolutional network generating a pixel-level depth map, or depth estimate in conjunction with object size and position.

As used herein, objects relate to persons, pedestrians, animals, vehicles, roadways, lane markers, hazards and objects in general relative to the position of the vehicle. Accordingly, distance determinations relate to a distance from the vehicle, or position associated with the vehicle, to the object in one or more directions. Distance values may relate to one or more directional parameters and/or vectors to describe an object relative to the vehicle or image sensor. References to object depth and object distance are interchangeable as used herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a graphical representation of object detection by an assisted driving system of a vehicle according to one or more embodiments. System 100 of FIG. 1 is an assisted driving for a vehicle. System 100 may include module 101 associated with a vehicle assisted driving system. According to one embodiment, system 100 is configured to detect objects based on image data captured by an imaging sensor, such as a camera 105, mounted to a vehicle. Operations of system 100 may be performed by module 101 for assisted driving operations including but not limited to autonomous driving functions. In one embodiment, module 101 may relate to an object detection module of an assisted driving unit. System 100 is configured to output distance determinations and may provide notifications based on detected objects. System 100 may be configured to include display 110 which may be part of the driver assist system to display representations of detected image data and graphical elements (e.g., bounding boxes, etc.) for detected objects. Display 110 may be part of a vehicle infotainment system to present one or more of image data, object indicators and representations of a scene detected by image sensor 105. In one embodiment, display 110 presents visual notifications to a driver using an infotainment system of the vehicle. In an exemplary embodiment, the threshold for issuing notifications can be user-specified or be based on standard practices. An example of notifications could be a pedestrian in the periphery of driver's vision who is about to cross the road or a stray animal. Presentation may be based on the distance value determined for each object. In other embodiments, presentation may include distance values (e.g., 5 ft. (1.5 m), 10 ft. (3 m), etc.).

In one embodiment, display 110 may be configured to represent a plurality of objects, such as first object 115 and second object 120.

System 100 may be an intelligent system for a vehicle that acquires data about a surrounding environment through various sensors and processes the data using pre-trained algorithms to take decisions at required tasks. System 100 may employ processes for efficient object detection and distance determinations without the necessity of high-cost distance measurement hardware (e.g., LIDAR, etc.). System 100 can compensate for the lack of assistive data during the deployment phase by training a learning algorithm in which parameters are tuned to achieve the best possible object detection. In one embodiment, system 100 may be trained using both primary and assistive data for object detection. During deployment, system 100 may be only provided primary data detected by the vehicle.

According to one embodiment, system 100 is configured to detect a plurality of objects. Object detection as used herein may include determining distance values for objects relative to system 100, the vehicle 101 or image sensor 105. FIG. 1 shows a plurality of objects that may be detected by system 100, including first object 125 and second object 130. First object 125 represents a pedestrian (e.g., human) and second object 130 represents a vehicle. First object 125 and second object are related to two different classes of objects, namely person and automobile. System 100 may be configured to detect a plurality of object classes. System 100 may also be configured to detect roadway objects, such as roadway markings 135 (e.g., lane marking, etc.). According to one embodiment and as described herein, system 100 may be configured to detect first object 125 and second object 130. For each object detected, system 100 may analyze image data associated with a region of interest of the image data. Bounding boxes 140 and 145 may be determined associated with first object 125 and second object 130, respectively. Bounding boxes 140 and 145 may represent position of an object and/or object size relative to detected image data. As will be described in more detail below, system 100 and processes described herein may determine distance values from system 100 to detected objects. For example, distance 150 from system 100 to first object 125 and distance 155 from system 100 to second object 130 may be determined. According to one embodiment, processing frameworks provided herein allow for distance determinations to be calculated with object detection data. In one embodiment, system 100 may employ processes as described herein for object detection and calculation of distance values for objects, such as distance 150 and 155. According to one embodiment, distance values determined may be output by system 100 for control of a vehicle, such as to allow for assistive breaking, vehicle operating characteristics such as adaptive cruise control and assistive driving operations in general. In certain embodiments, distance determinations may be output to display 110 to provide notifications associated objects in a vehicle path or near the vehicle.

FIG. 1 shows two objects, it should be appreciated that additional objects may be detected and that a plurality of objects and objects distances may be handled by system 100. In addition, object classes are not limited to persons or automobiles. Other object types and classifications may be employed within the scope of the disclosure.

Figure 2:
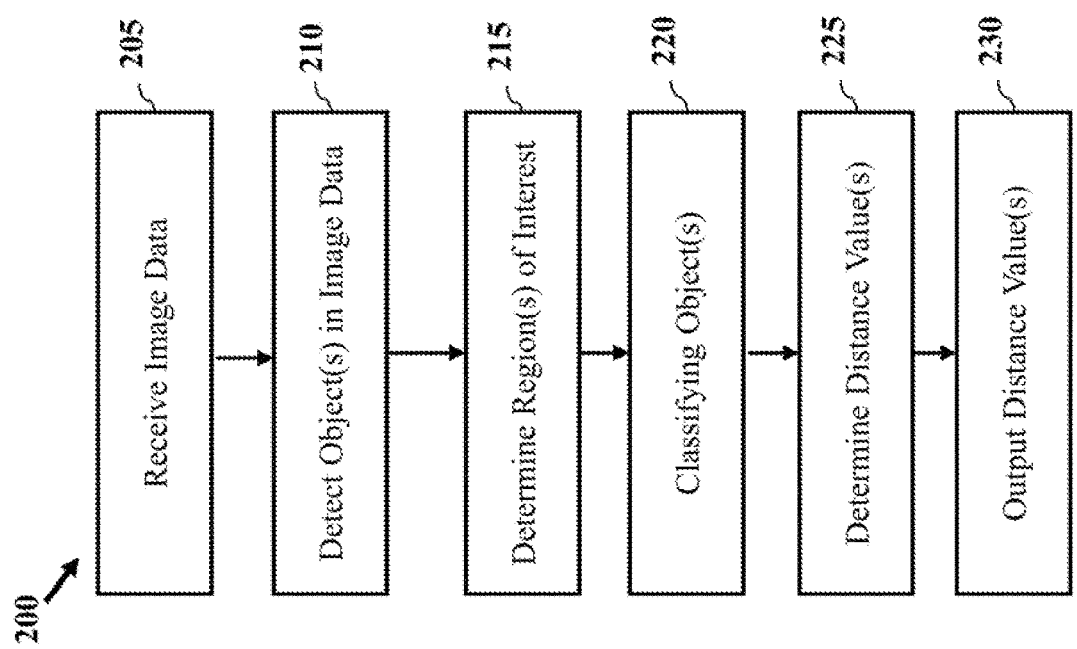
FIG. 2 depicts a process for object detection by an assisted driving system of a vehicle according to one or more embodiments.

FIG. 2 depicts a process for object detection by an assisted driving system of a vehicle according to one or more embodiments. Process 200 may be employed by a device, such as an assisted driving module (e.g., module 101 associated with an assisted driving unit) of an assisted driving system (e.g., system 100) and one or more other components to detect objects and determine object distance. According to one embodiment, process 200 may be initiated by a driver assist system module, such as an object detection module, receiving image data representing an outside of a vehicle at block 205. Image data received at block 205 may relate to video data captured by an optical image sensor, such as a front facing camera of the vehicle that provides image data. Image data received at block 205 may be provided from an image sensor mounted to the vehicle.

According to one embodiment, image data received at block 205 relates to a live feed of unexamined image data (e.g., not pre-recorded image data for training) associated with a real world driving situation according to one or more lighting levels (e.g., daytime, nighttime, low light, weather impacted, etc.)

At block 210, the object detection module detects at least one object in the image data. In one embodiment, detecting at least one object at block 210 includes determining a region of interest in the image data for the at least one object, classifying the at least one object, wherein a category is determined for the at least one object, and localizing the region of interest in the image data for the at least one object. The object detection module may output a bounding box list of objects detected. When there is no target object in received image data, the object detection module may output an empty bounding box list. According to one embodiment, the object detection module may utilize a framework that provides an output of fixed size objects continuously, such as objects that relate to background class objects, when no target object is found in detected image data. At block 215, the vehicle driver assist system determines, a region of interest in the image data for the at least one object using a trained convolutional network. One or more objects may be detected in the image data, as such, a plurality of regions of interest may be determined. A region of interest for an object (e.g., first object 125) may be assigned a bounding box to describe the objects position within image data. Process 200 may also include suppressing overlapping low confidence bounding boxes for detected objects.

At block 220, the vehicle driver assist system classifies each object according to a plurality of categories such that a category is determined for the detected object. By way of example, a pedestrian may be categorized as person, while a car may be categorized as type of vehicle. Categories may be assigned for one or more of a person, pedestrian, vehicle, roadway, lane marker, hazard and objects relative to the position of the vehicle, such as animals, bicycles, moveable traffic cones, etc. Each region of interest may be determined based on at least one trained parameter for object detection. Object detection may also be based on trained parameters, such as use a convolutional network framework that includes training for object distance and object depth relative to captured image data. Classification of objects can include estimating anchor boxes from concatenated outputs of multi-scale feature encoding layers and a convolutional architecture based on decoding layers. Multiple aspect ratios are applied to each feature layer to predict class labels, bounding boxes and a depth label for the at least one object. The region of interest is localized in the image data for each object to determine the objects position relative to image data. Localizing can include determining one or more of bounding box area, bounding box center, coordinates of the region of interest (e.g., X and Y coordinates of the image).

The object detection module may select frames or utilize all frames of received image data for detection of objects. Process 200 may be directed to a single frame or combination of frames to detect objects. In some embodiments, multiple frames of image data received at block 205 may be processed concurrently for detection objects and/or output by the device.

At block 225, the vehicle driver assist system determines a distance value for at least one object. The distance determination is determined based on the category of the object determined, localization of the region of interest, and object size relative to the image data. In certain embodiments, the distance value is determined by scaling object size determined from pixel-level sematic features and preserved instance-level features of input layers. According to another embodiment, the distance value is determined by hierarchical encoding layers that preserve instance-level features and pixel-level features within a shared convolutional architecture.

At block 230, the vehicle driver assist system outputs a distance value determination for the at least one object. Outputting can include providing the distance value for the at least one of a vehicle display unit, cruise control controller, emergency braking system and vehicle controller in general.

According to one embodiment process 200 determines distance using a convolutional neural network framework, such as the frameworks described in FIGS. 5 and 6 below.

Figure 3:
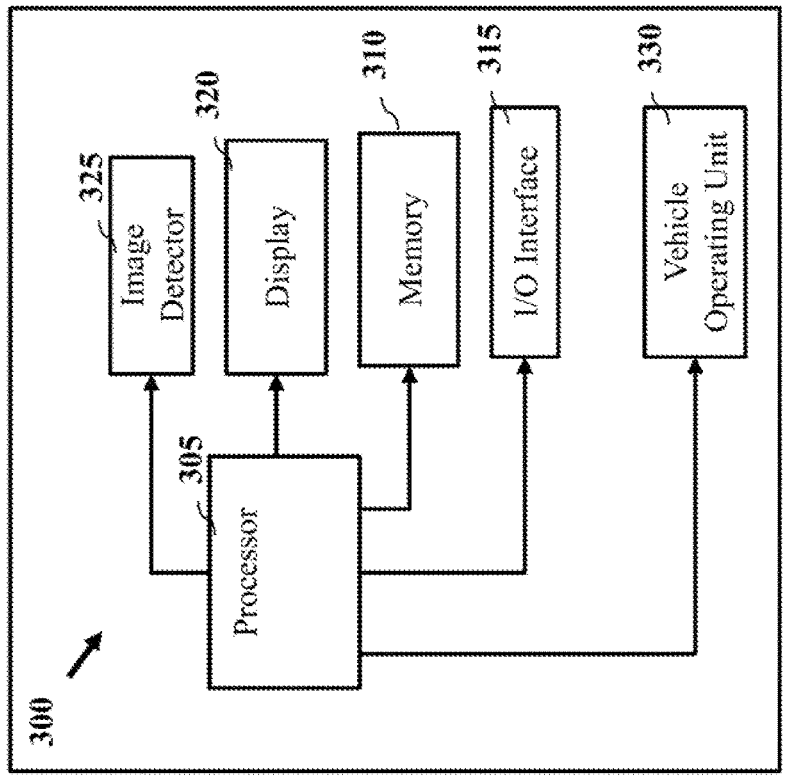
FIG. 3 depicts a diagram of a vehicle unit according to one or more embodiments.

FIG. 3 depicts a diagram of a vehicle unit according to one or more embodiments. Vehicle unit 300 includes processor 305, memory 310, input/output interface 315 and image detector 325. In some embodiments, vehicle unit 300 may optionally include image detector 325. According to one embodiment, image detector 325 relates to a digital camera configured to optically detect and capture image data. Exemplary frame detection rates of image detector 325 may be one or more frame detection rates, including but not limited to 60 Hz, 120 Hz, 240 Hz, etc.

Vehicle unit 300 may be configured to receive, and/or capture image data, and detect one or more objects in the image data. Processor 305 may be configured to provide one or more assisted driving functions, including controlling presentation and notifications and vehicle operations (e.g., breaking, speed adjust, cruise control, etc.). According to one embodiment, processor 305 may be configured to execute functions of an object detection module based on image data received from image detector 325 (e.g., image sensor). Processor 305 may be configured to detect at least one object in the image data by determining a region of interest in the image data for the at least one object, classifying the at least one object, and localizing the region of interest in the image data for the at least one object. Processor 305 may determine a distance value for at least one object based on the category determined, localization of the region of interest, and object size relative to the image data. Processor 305 may output a distance value determination for the at least one object.

According to one embodiment, processor 305 is configured to perform one or more operations, such as the operations to output object detection notifications. Memory 310 may include ROM and RAM memory for operation of vehicle unit 300 and processor 305. Input/output interface 315 may include one or more inputs or controls for operation of vehicle unit 300. Display 320 may relate to a vehicle display for presentation of detected image data and one or more graphical elements or notifications. Display 320 may present a control interface for vehicle unit 300.

According to one embodiment, object distances may be output by processor 305 to one or more vehicle operating units, such as vehicle operating unit 330. According to one embodiment, vehicle unit 300 may interface with vehicle operating unit 330 associated with a control function of a vehicle, such as vision based adaptive cruise control, automatic emergency breaking, and on-board telematics and operating systems in general. According to one embodiment, processor 305 outputs distance determinations for each distance value. According to another embodiment processor 305 outputs a distance determination when a threshold is met, such as objects located within a particular distance of a vehicle. Processor 305 may adaptively output object distance determinations based on vehicle speed and acceleration. For example, objects within or greater than five feet from a vehicle may not lead to output of distance values when the vehicle is traveling at a slow speed, such as less than 5 miles per hour. Alternatively, in some embodiments, distance values for objects within five feet when the vehicle is traveling at speeds over a certain value, such as 5 miles per hour may trigger output of distance determinations. When vehicle operating unit 330 relates to a vehicle breaking unit, distance determinations may be applied to allow for activation of the breaking system. When vehicle operating unit 330 relates to cruise control unit, distance determinations may be applied to allow control of vehicle speed, direction and/or breaking.

Figure 4A:
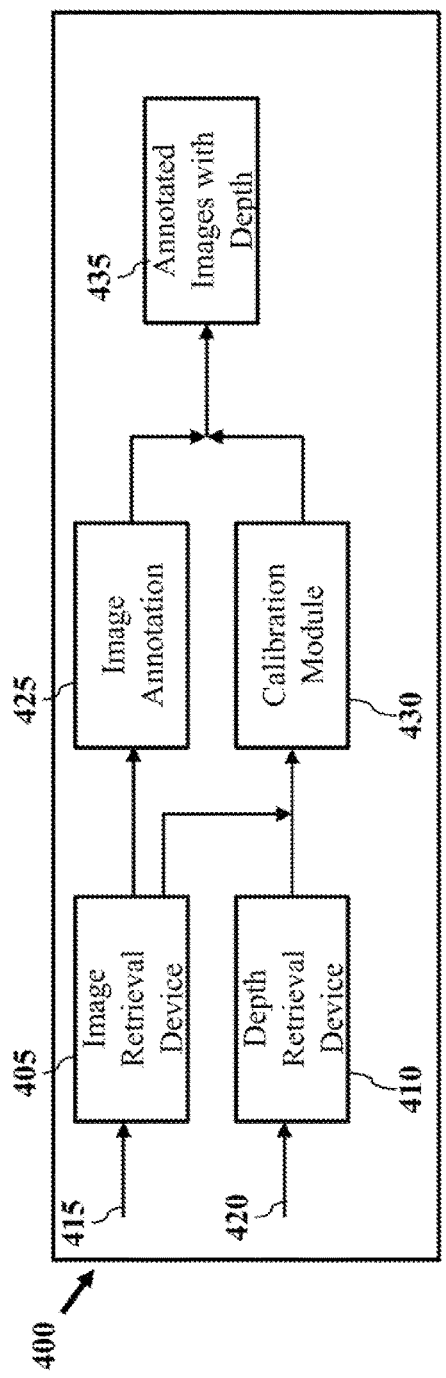
FIG. 4A depicts a flow diagram for training object detection according to one or more other embodiments.
Figure 4B:
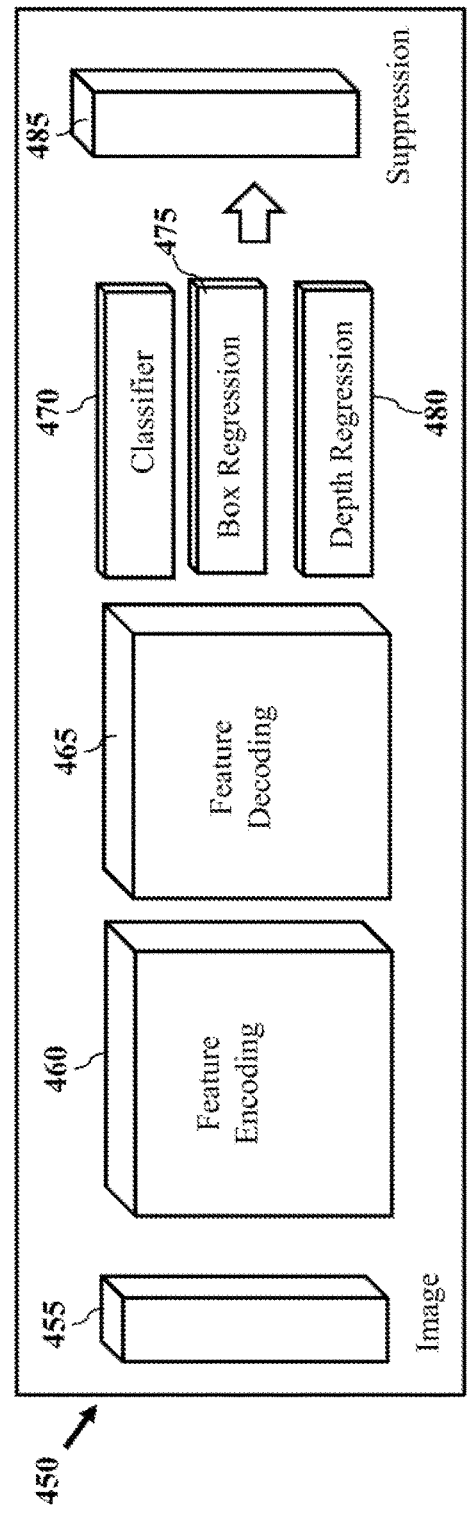
FIG. 4B depicts graphical representation of network structure for object detection according to one or more embodiments.

According to one embodiment, process 400 of FIG. 4A provides a learning phase for training a system to perform object detection. According to another embodiment process 455 of FIG. 4B provides a process to train detection of objects without the use of an assistive sensor (e.g., LIDAR, radar, etc.).

Referring first to FIG. 4A, process 400 relates to flow diagram for training object detection according to one or more other embodiments. Process 400 may relate to a training data preparation stage. According to one embodiment, process 400 is not used by a vehicle assistance unit during operation of a vehicle. Rather, process 400 may be employed to configure device operation for later use with only optical image data as input. Process 400 includes receiving image data 415 (e.g., primary data) by image retrieval deceive 405 and receiving distance data 420 (e.g., assistive data) by a depth retrieval device 410. References to devices in FIGS. 4A and 4B may relate to modules of components of a vehicle assistive system, such as modules of a processor. According to one embodiment, image data 415 relates to optical image (or data) and distance data 420 relates a distance measurement.

Image retrieval device 405 provides image data to image annotation module 425 which annotates objects in image data. Calibration module 430 receives image data image retrieval device 405 and depth information for the image scene from depth retrieval device. Output of image annotation module 425 and calibration module 430 is provided to module 435 to annotate images with depth information. Module 435 may be configured to provide an extraction operation to match annotated objects with distance measurements from calibration module 430.

According to one embodiment, module 430 may be trained to produce output of objects that correlate to distance measurements determined by assistive technologies. Objects may relate to fixed and non-fixed (e.g., moving, non-permanent, etc.) objects. Appearance attributes of objects may be stored and utilized to identify objects using optical image data and to identify object distance. Process 400 provides training a learning algorithm in which parameters are tuned to achieve the best possible object detection. These parameters compensate for the lack of assistive data during the deployment phase. In one embodiment, training of process 400 uses both primary and assistive data for object detection and distance determination. During deployment, only primary data may be provided for training the algorithm. This encourages the pattern extraction even when limited to primary data.

Process 400 provides training a network model. The neural network model may have a structure that includes feature encoding of layers, feature decoding layers and non-maximum suppression. Process 400 aligns perceived distance information, such as a depth map, with each input image pixel. For example, calibration module 430 calibrates an image retrieval device 405 and depth retrieval device 410. Depth retrieval device 410 may relate to one or more of a stereo camera, infra-red depth sensor, and LiDAR (Light detection and Ranging) device. Ground truth object classes, object location and distance information may be required at the same time for training. Each annotated image by image annotation module 425 will provide each of these data points which object class and location may be determined separately (e.g., manually) during training. During training of process 400 gradient updates within shared convolutional layers may be influence by detection and segmentation labels.

FIG. 4B depicts graphical representation of network structure for object detection according to one or more embodiments. Process 450 provides a neural network structure for an object detection module. Process 450 includes receiving image data 450 (e.g., primary data). Received image data may relate to image data captured from a vehicle. According to one embodiment, along with bounding boxes regression for object detection frameworks discussed herein enable predicting depth (e.g., determining distance) for each region of interest in feature maps. Feature encoding layers relate to hierarchical convolution layers that may be pre-trained in large scale image classification tasks. Feature decoding layers are trained to predict object classes, bounding boxes and depth, and multiple object classification may be handled by a layer following the output layers. A max suppression operation suppresses overlapped low confidence bounding boxes with high confidence ones.

Feature encoding module 460 identifies one or more elements and regions of interest in received image data 450. According to another embodiment, module 460 may employ one or more learning algorithms to encode objects of interest and enhance object detection. According to one embodiment, module 460 may extract patterns from primary data similar to those extracted from primary and assistive data in process 400.

Feature decoding module 465 provides a convolutional block to identify objects in image data 455. Module 465 may employ one or more learning algorithms to identify objects of interest and enhance object detection. In one embodiment, object identification enhances objects of interest based on frame comparison. Once an object is identified, further deep learning algorithms are used for enhancing the object of interest. The object and/or graphical elements may then be superimposed on the original image data. Object enhancement may include prior knowledge of static objects (road signs, potholes, etc.) from available images or other data available.

Feature encoding module 460 and feature decoding module 465 may generate feature maps providing a representation of the dominant features of the image at different scales. Using multiple feature maps increases the likelihood of any object (large and small) to be eventually detected, localized and appropriately classified. Classifier module 470 assigns a category or classification to each detected object. Box regression module 475 provides a bounding box regression function to determine object location based on the classification of classifier module 470. Depth regression module 480 trains parameters for determining object distance and object depth based on object location, and classification. Suppression module 485 determined parameters to removes low threshold regions of interest.

According to one embodiment, process 450 provides a neural network structure characterized by the ability to extract features using shared convolutional feature maps. Convolutional neural network models may be pre-trained on a large-scale image classification data set. The model may decode extracted features and predict bounding boxes, class labels for objects and distance. According to one embodiment, a network model using a plurality of base layers (e.g., 50 base layers) for feature extraction. In certain embodiments, pixel level depth prediction and prediction of depth from object level can be eliminated using a framework including multi-task inference, instance level depth estimation and training. Multi task inference may be provided by a convolutional model using a shared convolutional architecture. In one embodiment, FIGS. 5 and 6 below discuss frameworks for determining distance using a convolutional neural network. According to one embodiment, network models are described that provide a small amount of computational cost with respect to a convolutional neural network based detection framework to enable determinations of object distance with accuracy. According to on embodiment, the frameworks discussed herein utilize feature maps to preserve both object appearance information, which can be used for object classification, and object location information, which can be used to determine the precise location of an object in a three dimensional space. According to one embodiment, object appearance and object location are both used to determine object class and object location in a given image and to serve as a basis for detecting object location. Object location can be determined based on object appearance and the size of a bounding box directly from feature maps.

Figure 5:
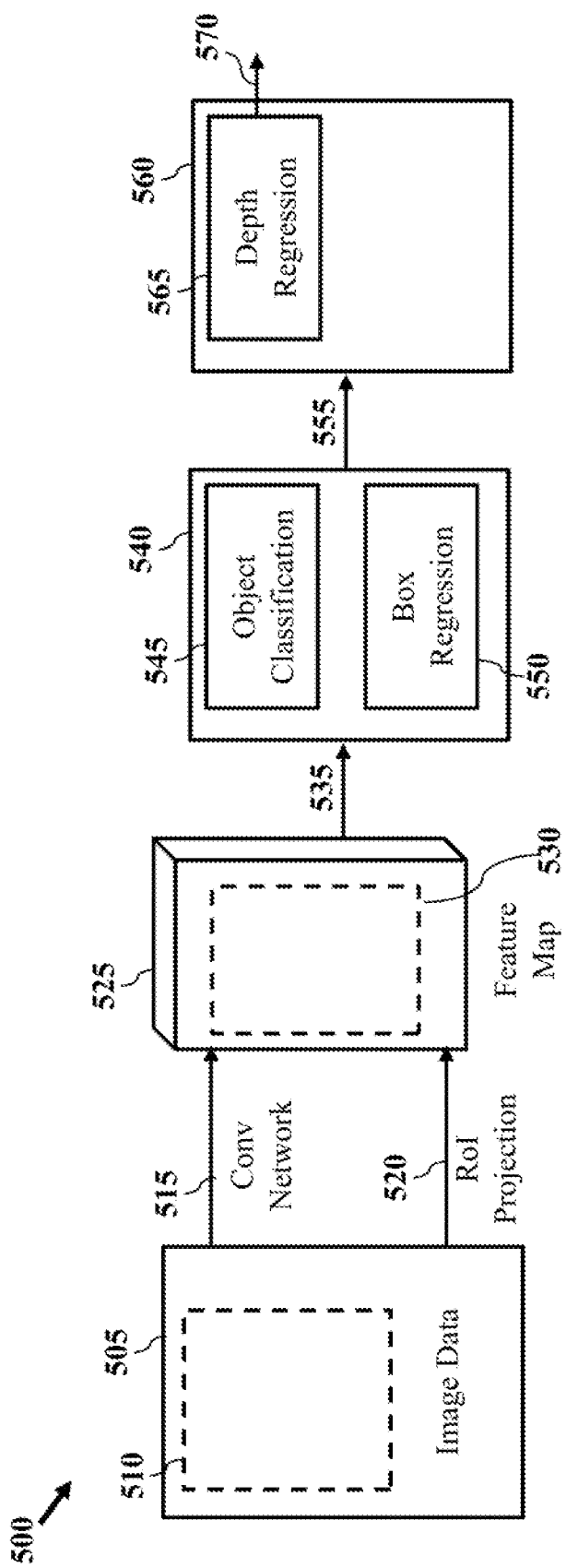
FIG. 5 depicts a process for object detection and output according to one or more embodiments.

FIG. 5 depicts a process for object detection and output according to one or more embodiments. Process 500 illustrates an exemplary framework for determining distance using a convolutional neural network. Process 500 may be employed by a device, such as an object detection module of an assisted driving unit (e.g., module 101), and one or more other components to detect objects and determine distance for objects. According to one embodiment, process 500 may be initiated by receiving image data 505. A region of interest 510 of image data 505 is shown for illustration. The system may be configured to identify various objects present in scene and localize them by super-imposing a bounding box, or other graphical element, over each detected object.

Image data is applied to a convolutional network, shown as 515 and a region of interest projection 520 to determine a convolutional feature map 525 including region of interest 530. Each region of interest is then provided as output 535 to module 540 to detect objects. Module 540 includes object classification module 545 and box regression 550.

According to one embodiment, the framework of process 500 provides a depth regression function for each region of interest. Similar to a bounding box regression, sigmoid activation may be employed following a fully connected layer to limit the output range within a range (e.g., 0 to 1). The output range may be used to scale a depth value. In one embodiment, a scaling range may be based on a value, such as 225, such that the determined distance of an object ranges from 1 to 255 meters.

In one embodiment, module 540 may employ a Fast Region-based Convolutional Network method (Fast R-CNN) for object detection. Fast R-CNN builds on previous work to efficiently classify object proposals using deep convolutional networks. Object classification module 545 of module 540 categorizes images, given a set of classes (e.g. cat, dog), and having the network determine the strongest class present in the image. Box regression module 550 can locate and detect objects in images providing a set of bounding boxes that closely match each of the detected objects. Object classification and box data is provided as output o module 560 include a depth regression module 565 configured to determine a distance value for each object received by module. Distance values may be output as 570.

According to one embodiment, module 540 is configured to extract features using convolutional feature maps. Module 540 may be configured to perform pooling on inputs of non-uniform sizes to obtain fixed-size feature maps.

Figure 6:
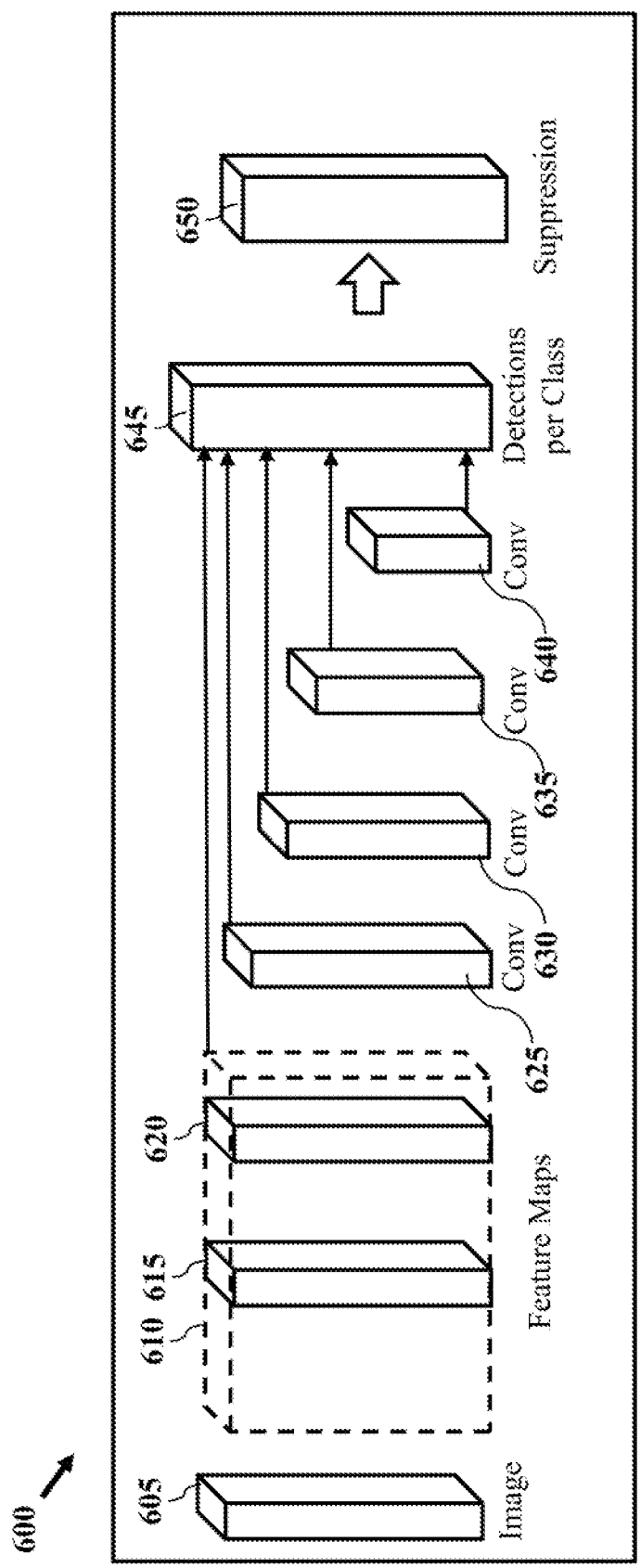
FIG. 6 depicts a process for object detection and output according to another embodiment.

FIG. 6 depicts a process for object detection and output according to another embodiment. Process 600 illustrates an exemplary framework for determining distance using a convolutional neural network according to one or more embodiments. Process 600 provides a depth prediction framework. According to one embodiment, process 600 may relate to a single-shot detection (SSD) based depth prediction framework. Process 600 may perform object localization and classification in a single forward pass of the network Process 600 may be employed by a device, such as an object detection module (e.g., object detection module 101) of a vehicle driver assist system (e.g., system 100) and one or more other components to detect objects.

According to one embodiment, process 600 may be initiated by converting received image data 605 to feature maps 610. Feature maps 610 may include representations such as 615 and 620. Process 600 may determine depth as an additional component of object localization. In certain embodiments, distance determinations are determined based on determining an x-axis and y-axis representation for a region (e.g., center point) in the input image.

Feature map 610 is a representation of the dominant features of the image at different scales. Multiple feature maps increases the likelihood of any object (large and small) to be eventually detected, localized and appropriately classified. Anchors are pre-computed, fixed size bounding boxes that closely match the distribution of the original ground truth boxes. The system may be configured to identify various objects present in scene and localize them by super-imposing a bounding box, or other graphical element, over each detected object.

Process 600 may adaptively reduce the number of outputs in the global prior and local feature maps. Convolution layers 625, 630, 635, and 640 may be employed for feature extractions. According to one embodiment, convolution layers 625, 630, 635, and 640 may be stacked convolution units, in this example four stacked units. Each unit of convolution layers 625, 630, 635, and 640 may contain a 1×1 convolution layer and a 3×3 convolution layer, with rectified linear units (ReLU) base activation following each convolutional layer. For each anchor box, multiple aspect ratios are applied to each of the feature layers to predict class labels, bounding boxes and depth labels. As such, instance level object detection with a depth determination (e.g., distance) may be based on hierarchical encoding layers. Details of the location of low-level encoding layers and instance level object categorical information from higher layer encoding layers improve the network architecture. In one embodiment, detections per class module 645 provides two branches that are appended after each internal feature map, with one being an object categorical determination branch that calculates probability of each object category per anchor box. The other branch predicts the object center, size and distance information.

Suppression module 650 provides non-maximum suppression (NMS). Given the large number of boxes generated during a forward pass of process 600, bounding boxes may be discarded by applying non-maximum suppression where boxes with a confidence loss threshold less than a confidence threshold are discarded. In one embodiment, only the top predictions are retained to ensure the most likely identifications are retained while noise is removed. Suppression module 650 can decrease the segmentation output size to reduce the computations required for object classification.

While this disclosure has been particularly shown and described with references to exemplary embodiments thereof, it will be understood by those skilled in the art that various changes in form and details may be made therein without departing from the scope of the claimed embodiments.

What is claimed is:

1. A method for object detection and object distance determination by an assisted driving system of a vehicle, the method comprising:
    receiving, by a module of an assisted driving unit, image data detected by an image sensor mounted to the vehicle;
    detecting, by the module of the assisted driving unit, at least one object in the image data, wherein detecting the at least one object includes:
        determining a region of interest in the image data for the at least one object;
        classifying the at least one object, wherein a category is determined for the at least one object; and
        localizing the region of interest in the image data for the at least one object, wherein localizing the region of interest includes predicting a bounding box for the at least one object that represents a size of the at least one object relative to the detected image data based on the classification of the at least one object;
    determining, by the module of the assisted driving unit, a distance value for the at least one object, wherein the distance value determination is determined based on the category determined, localization of the region of interest, and the bounding box; and
    outputting, by the module of the assisted driving unit, the distance value determination for the at least one object;
    wherein classifying the at least one object includes estimating anchor boxes from concatenated outputs of multi-scale feature encoding layers and decoding layers.

2. The method of claim 1, wherein the image data received by the module is captured by an optical image sensor configured to output image data.

3. The method of claim 1, wherein detecting the at least one object includes detection of one or more of a person, a pedestrian, a vehicle, a roadway, a lane marker, and a hazard relative to the position of the image sensor.

4. The method of claim 1, wherein the region of interest is determined based on at least one trained parameter for object detection and object distance.

5. The method of claim 1, wherein multiple aspect ratios are applied to each feature layer in the multi-scale feature encoding layers and decoding layers to classify the at least one object, the bounding box, and a depth label for the at least one object.

6. The method of claim 1, wherein the distance value is determined by scaling object size determined from pixel-level semantic features and preserved instance-level features of input layers.

7. The method of claim 1, wherein the distance value is determined by hierarchical encoding layers that preserve instance-level features and pixel-level features within a shared convolutional architecture.

8. The method of claim 1, wherein outputting includes providing the distance value for the at least one of a vehicle display unit, a cruise control controller, an emergency braking system, and a vehicle controller.

9. The method of claim 1, further comprising suppressing overlapping low confidence bounding boxes.

10. An assisted driving module comprising:
an image sensor to detect image data; and
an object detection module coupled to the image sensor, the object detection module including a processor configured to:
receive the image data detected by the image sensor mounted to a vehicle;
detect at least one object in the image data, wherein detecting the at least one object includes:
determining a region of interest in the image data for the at least one object;
classifying the at least one object, wherein a category is determined for the at least one object; and
localizing the region of interest in the image data for the at least one object, wherein localizing the region of interest includes predicting a bounding box for the at least one object that represents a size of the at least one object relative to the detected image data based on the classification of the at least one object;
determine a distance value for the at least one object, wherein the distance determination is determined based on the category determined, localization of the region of interest, and the bounding box; and
output the distance value determination for the at least one object;
wherein classifying the at least one object and predicting the bounding box for the at least one object includes estimating anchor boxes from concatenated outputs of multi-scale feature encoding layers and decoding layers.

11. The assisted driving module of claim 10, wherein the image data received by the assisted driving module is captured by an optical image sensor configured to output image data.

12. The assisted driving module of claim 10, wherein detecting the at least one object includes detection of one or more of a person, a pedestrian, a vehicle, a roadway, a lane marker, and a hazard relative to the position of the image sensor.

13. The assisted driving module of claim 10, wherein the region of interest is determined based on at least one trained parameter for object detection and object distance.

14. The assisted driving module of claim 10, wherein multiple aspect ratios are applied to each feature layer in the multi-scale feature encoding and decoding layers to predict the classification of the at least one object, the bounding box, and a depth label for the at least one object.

15. The assisted driving module of claim 10, wherein the distance value is determined by scaling the object size determined from pixel-level semantic features and preserved instance-level features of input layers.

16. The assisted driving module of claim 10, wherein the distance value is determined by hierarchical encoding layers that preserve instance-level features and pixel-level features within a shared convolutional architecture.

17. The assisted driving module of claim 10, wherein outputting includes providing the distance value for at least one of a cruise control controller, an emergency braking system, and a vehicle controller.

18. The assisted driving module of claim 10, further comprising suppressing overlapping low confidence bounding boxes.

* * * * *